United States Patent [19]

Hamilton

[11] Patent Number: 5,200,960
[45] Date of Patent: Apr. 6, 1993

[54] STREAMING TAPE DIAGNOSTIC

[75] Inventor: Robert S. Hamilton, Webster, N.Y.

[73] Assignee: Xerox Corporation, Stamford, Conn.

[21] Appl. No.: 586,353

[22] Filed: Sep. 21, 1990

[51] Int. Cl.$^5$ .................. G01R 31/28; G06F 11/00
[52] U.S. Cl. .................................. 371/24; 371/25.1; 371/71
[58] Field of Search ................. 371/21.1, 24, 71, 25.1

[56] References Cited

U.S. PATENT DOCUMENTS

| | | | |
|---|---|---|---|
| 2,871,289 | 1/1959 | Cox et al. | 371/71 |
| 3,439,343 | 4/1969 | Stahle | 371/24 |
| 3,751,649 | 8/1973 | Hart, Jr. | 371/71 |
| 3,794,818 | 2/1974 | Kennedy | 371/71 |
| 3,940,601 | 2/1976 | Henry et al. | 371/71 |
| 4,266,294 | 5/1981 | Daughton et al. | 371/24 |
| 4,630,269 | 12/1990 | Gershenson et al. | 371/24 |
| 4,750,181 | 6/1988 | McDonald et al. | 371/71 |
| 4,841,525 | 6/1989 | Lieske et al. | 371/24 |
| 4,860,293 | 8/1989 | Engel et al. | 371/71 |
| 4,876,685 | 10/1989 | Rich | 371/24 |

Primary Examiner—Charles E. Atkinson
Attorney, Agent, or Firm—Ronald F. Chapuran

[57] ABSTRACT

A method of diagnosing the transfer of data between an external serial tape and a disk memory in an electronic image processing apparatus having a controller for directing the operation of image processing means, the controller including a plurality of processors, a system memory, the disk memory, and an external storage device port for communicating with the tape for serially storing data, comprising the steps of creating a plurality of blocks of data for transfer to the tape via the external storage device port transferring said plurality of blocks of data via the external storage device port to the tape, recreating said plurality of blocks of data in a plurality of verification buffers, reading the plurality of blocks of data from the tape via the external storage device port to a plurality of tape buffers, and comparing the plurality of blocks of data from the tape in the tape buffers with the data in the plurality of verification buffers in a parallel manner.

2 Claims, 15 Drawing Sheets

STREAMING TAPE DIAGNOSTIC

BACKGROUND OF THE INVENTION

The invention relates to a system for electronic imaging machine diagnostics, and more particularly, to a technique for analyzing the serial-parallel data transfer operation for such machines.

As electronic imaging machines such as copiers and printers become more complex and versatile in the jobs they can do, the need to process vast quantities of information becomes much more crucial. However, the necessity of providing sufficient memory space to process large blocks of data can become prohibitively expensive. This can be particularly important in transferring data between serial and parallel storage devices. On the other hand, minimizing memory capacity to save cost often results in slow and inefficient performance. Thus, techniques to achieve an appropriate balance between speed, efficiency, and economy take on greater significance. As the techniques to achieve an appropriate balance between speed, efficiency, and economy take on greater significance, likewise methods to analyze and diagnose such techniques must be provided to ensure satisfactory performance.

The prior art includes U.S. Pat. No. 4,630,269 disclosing a method for diagnosing malfunctions in a disk drive. A copy of a text pattern is stored in memory. A read-write processor translates the data to disk codes and writes them on diagnostic tracks of the disk. The disk codes are read, translated and compared to the original test pattern to determine any faults in the disk or in the path.

A difficulty with the prior art systems is the difficulty in providing serial to parallel and parallel to serial data transfer operations, and being able to adequately diagnose the operations. It would be desirable, therefore, to be able to transfer data serially between a serial tape and a parallel disk memory using parallel processors to keep up with an enormous quantity of data with a limited amount of memory.

It is an object, therefore, of the present invention to provide a method of serial to parallel and parallel to serial data transfer and being able to adequately diagnose the data transfer operations. Another object of the present invention is to transfer data serially between a serial tape and a parallel disk memory using parallel processors. Another object of the present invention is to be able to queue requests to read/write portions of a serial tape on a current-next basis using maximum tape bandwidth in order for the tape to run without stopping. Another object of the present invention is to be able to use multiprocessor capability to be able to test at the operational speed of tape to disk and disk to tape transfers while minimizing the required memory. Other advantages of the present invention will become apparent as the following description proceeds, and the features characterizing the invention will be pointed out with particularity in the claims annexed to and forming a part of this specification.

SUMMARY OF THE INVENTION

Briefly, the present invention is the method of diagnosing the transfer of data between an external serial tape and a disk memory in an electronic image processing apparatus comprising the steps of creating a plurality of blocks of data for transfer to the tape via an external storage device port, transferring the plurality of blocks of data via the external storage device port to the tape, recreating said plurality of blocks of data in a plurality of verification buffers, reading the plurality of blocks of data from the tape via the external storage device port to a plurality of tape buffers, and comparing the plurality of blocks of data from the tape in the tape buffers with the data in the plurality of verification buffers in a parallel manner.

For a better understanding of the present invention, reference may be had to the accompanying drawings wherein the same reference numerals have been applied to like parts and wherein:

DETAILED DESCRIPTION OF THE DRAWINGS

Figure 5A:
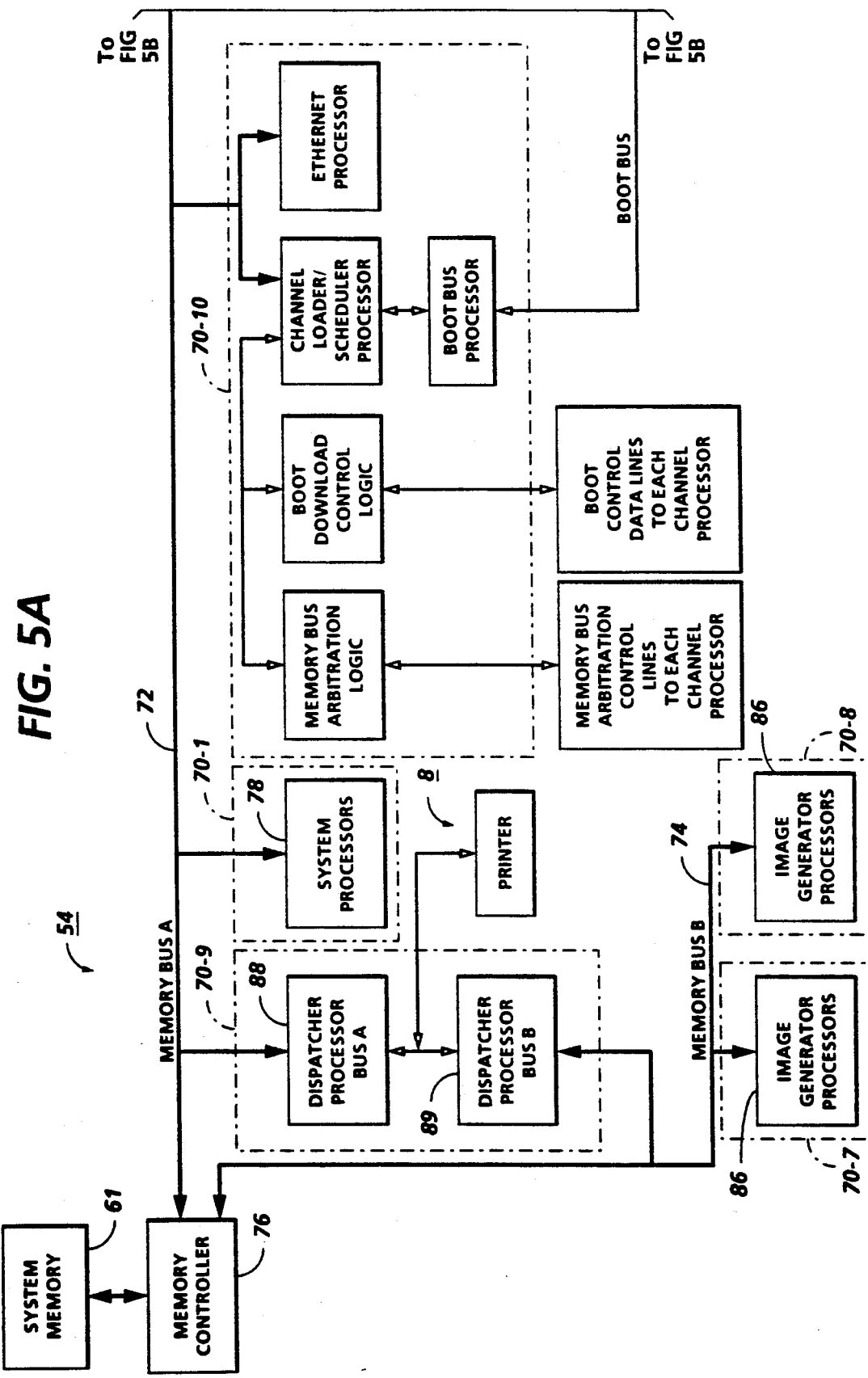
Figure 5B:
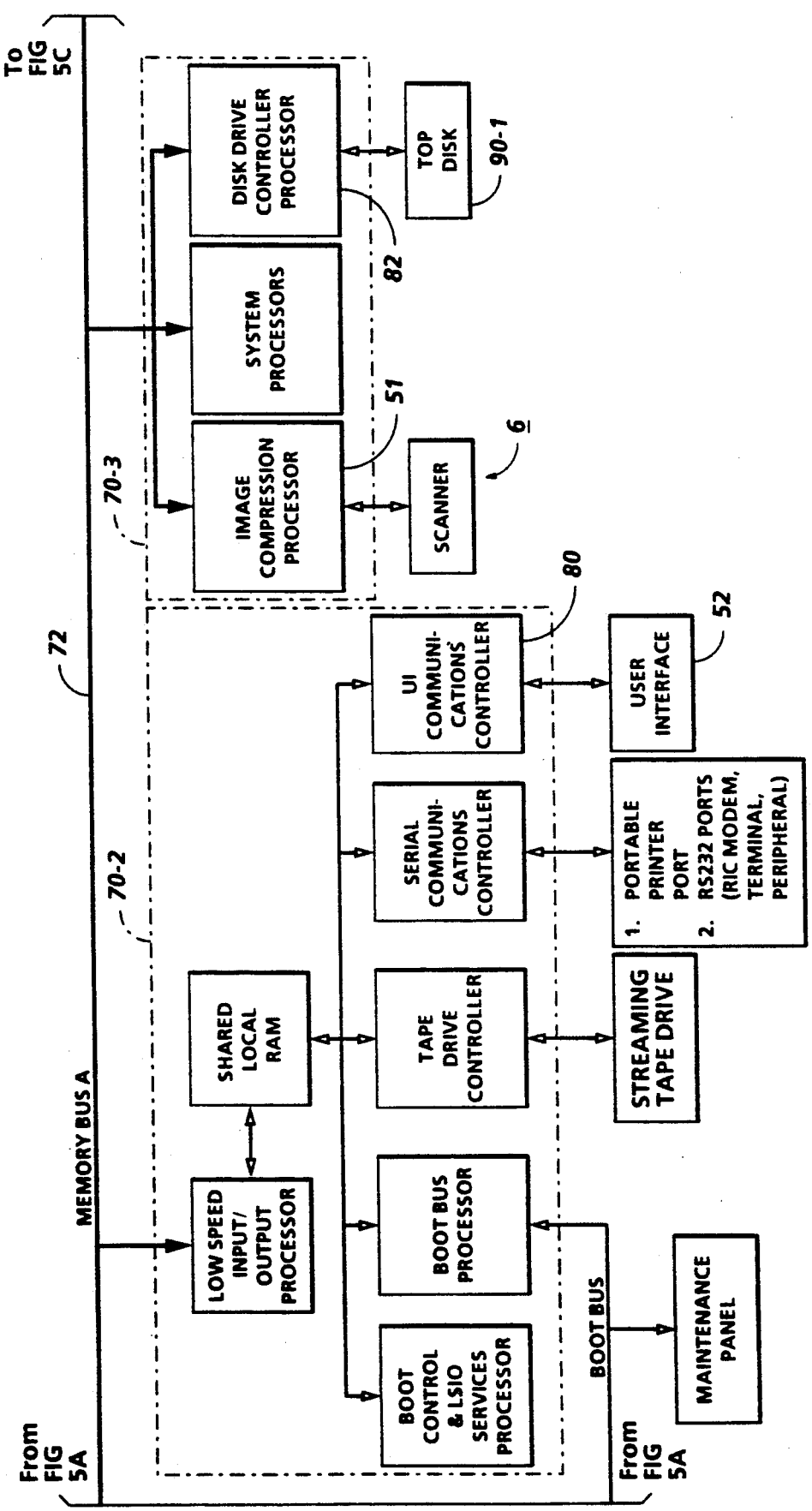
Figure 5C:
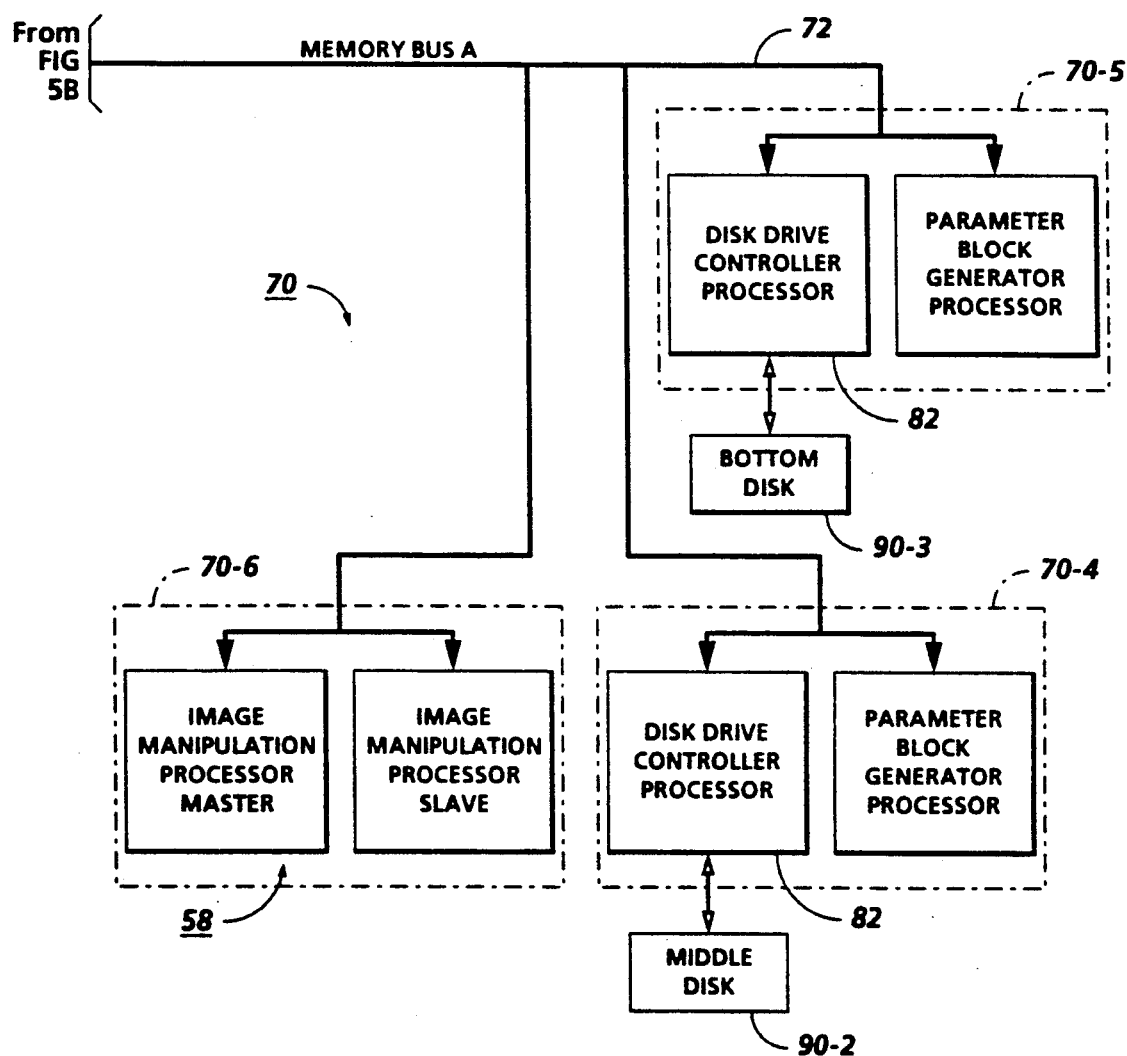
Figure 6:
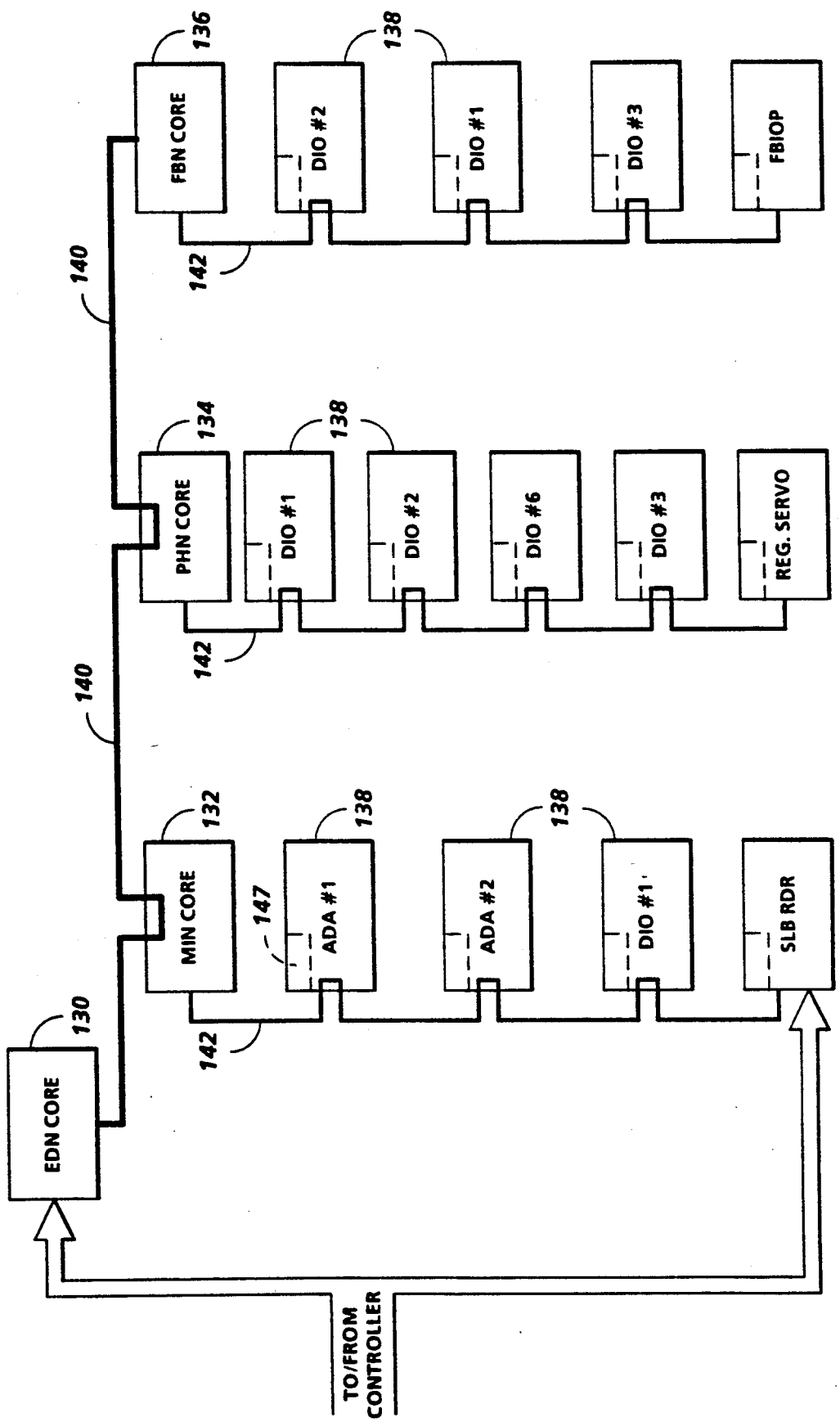
Figure 7:
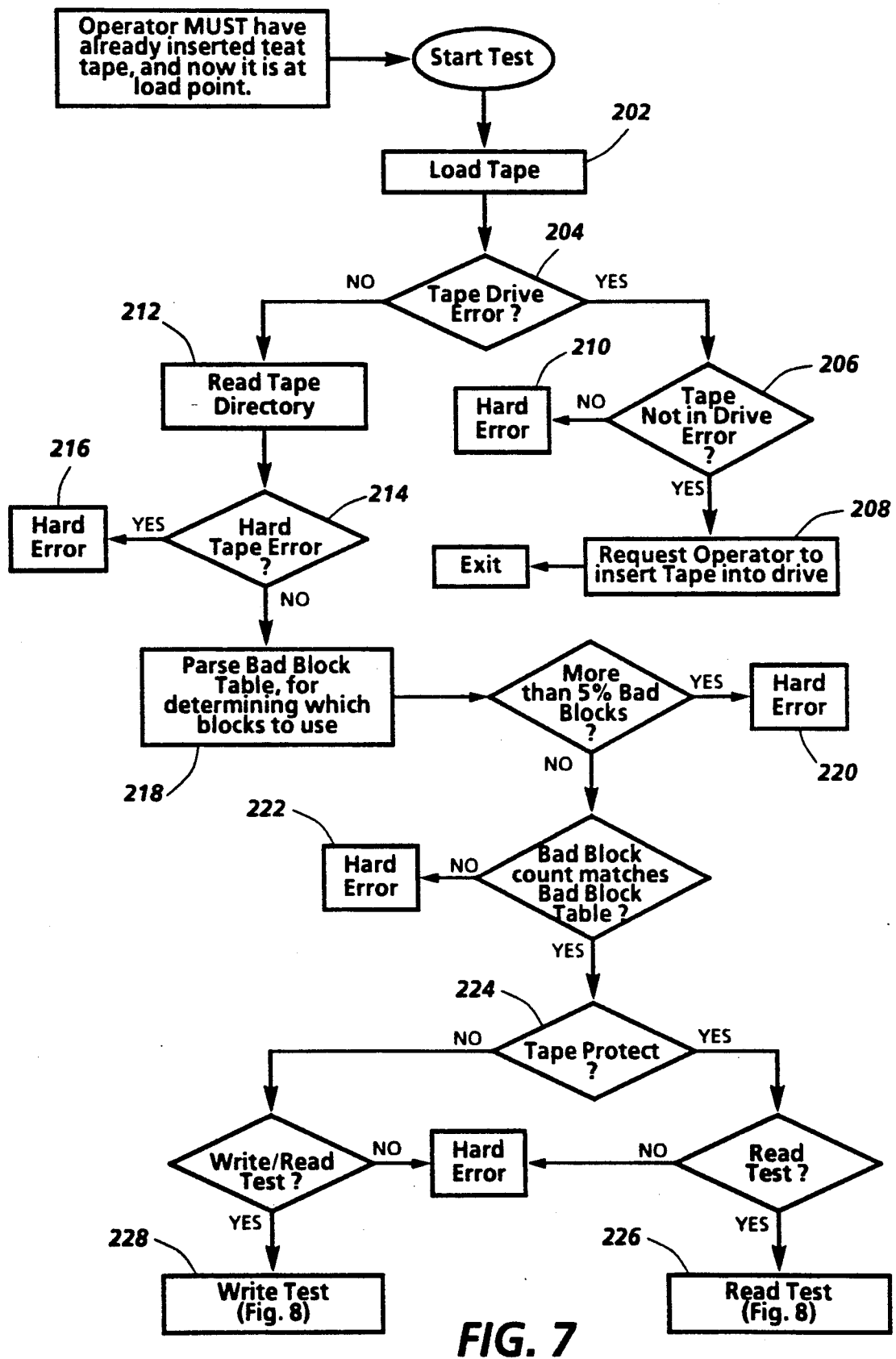
Figure 8:
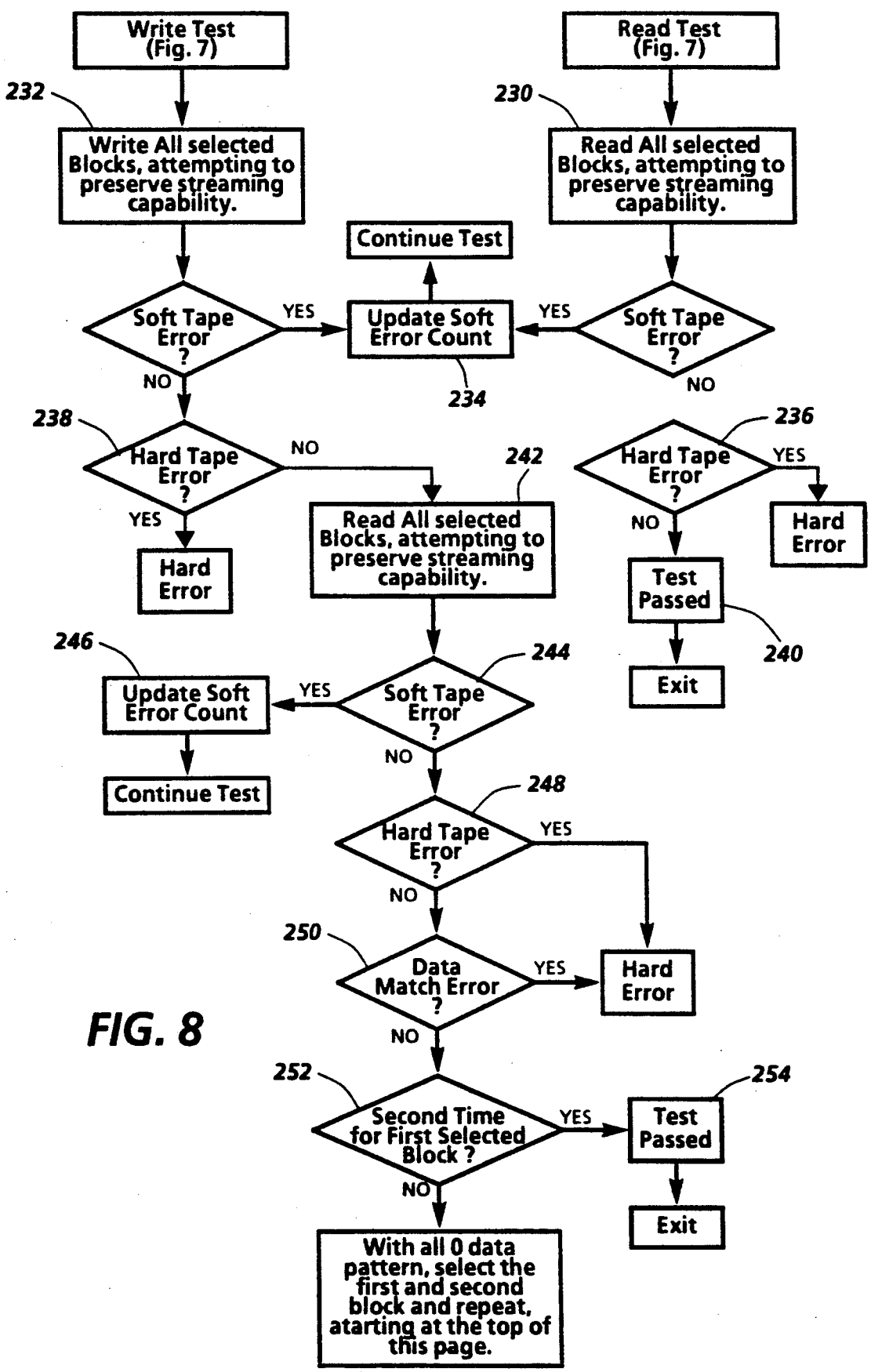
Figure 8A:
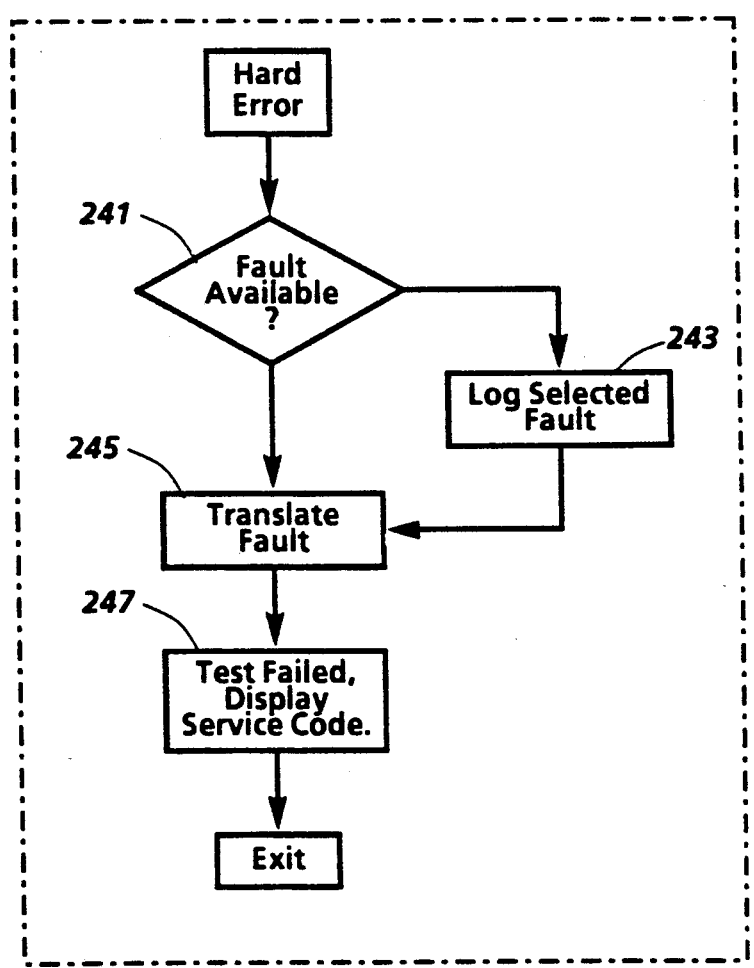
Figure 9:
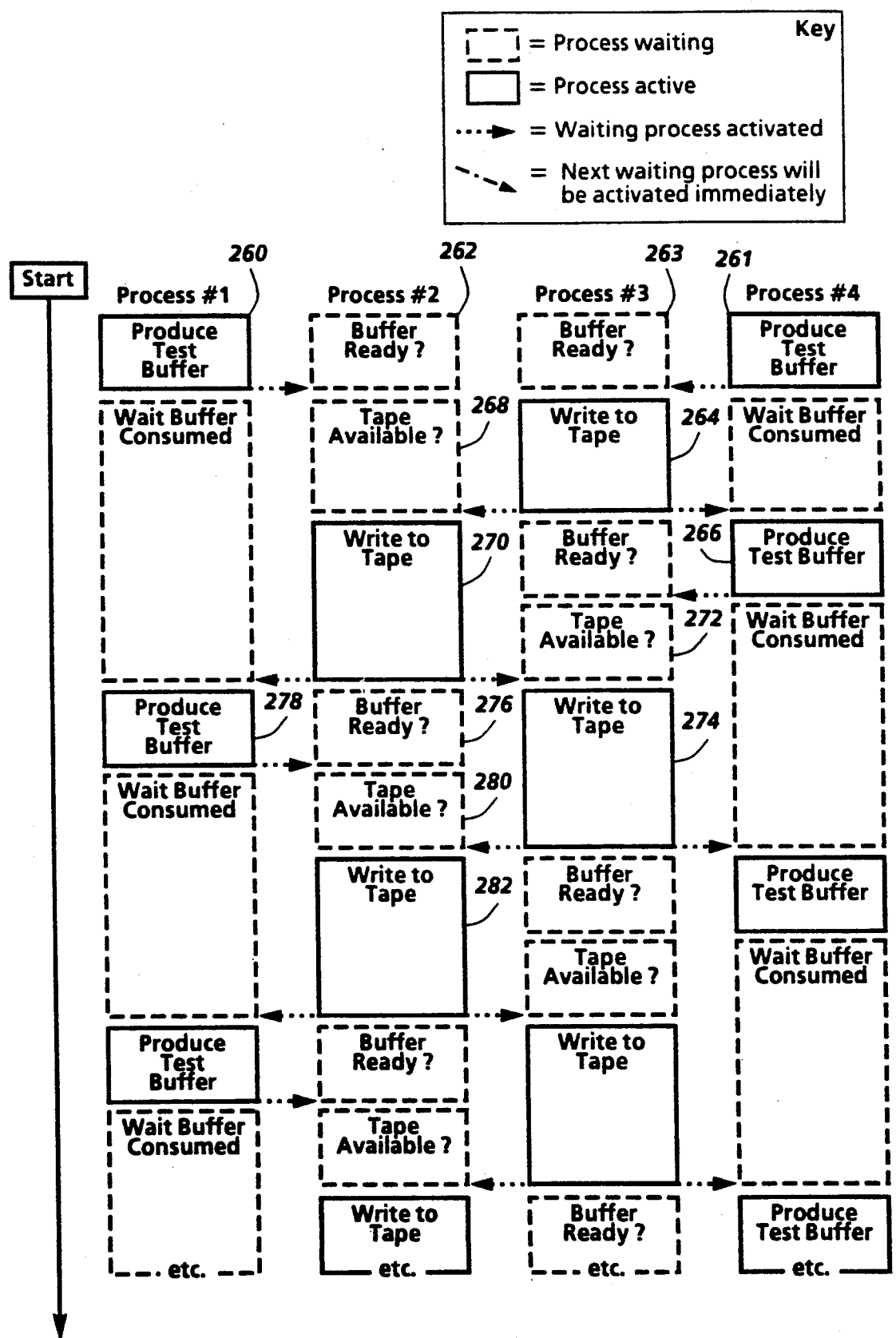
Figure 10:
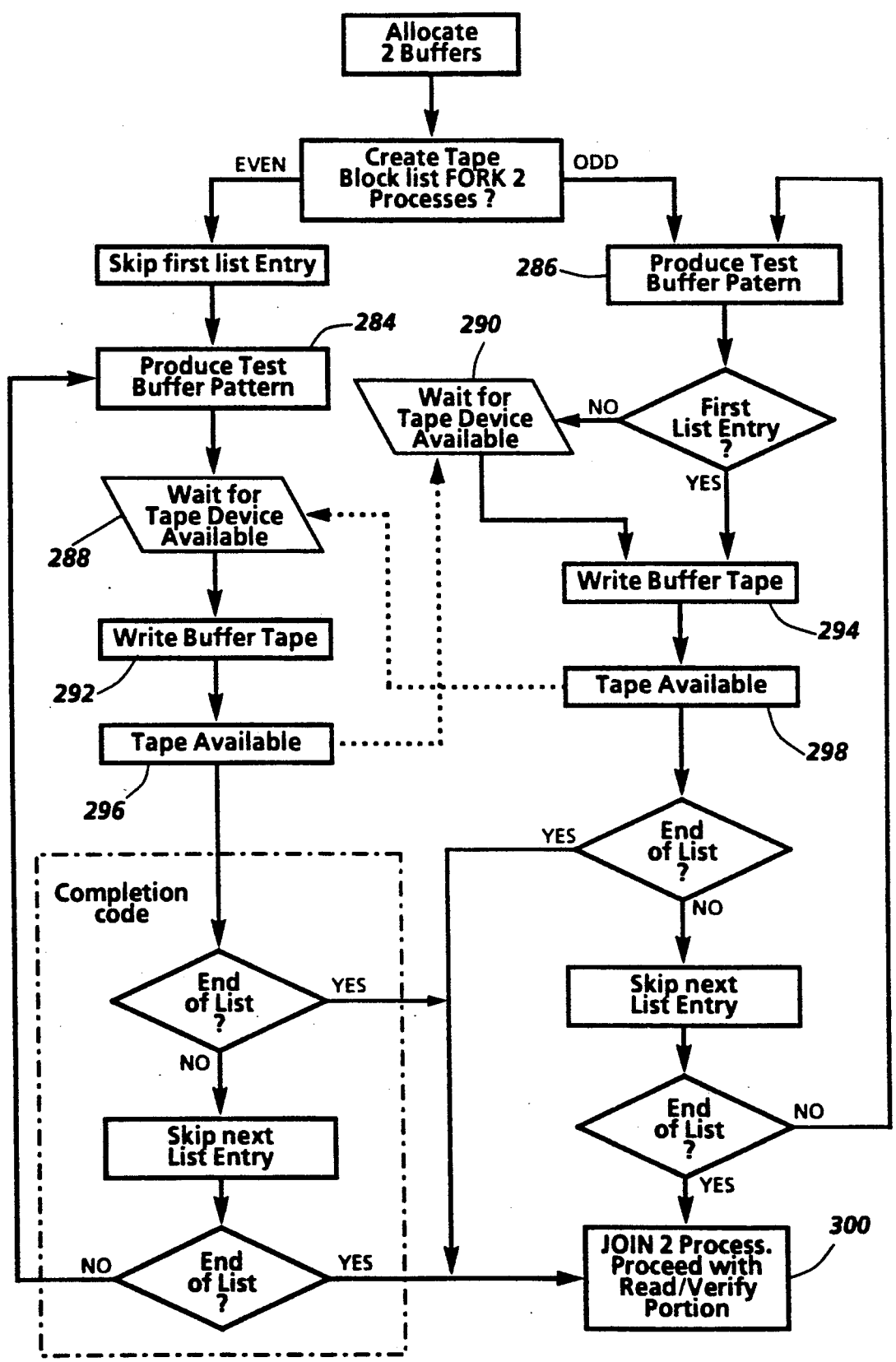
Figure 11:
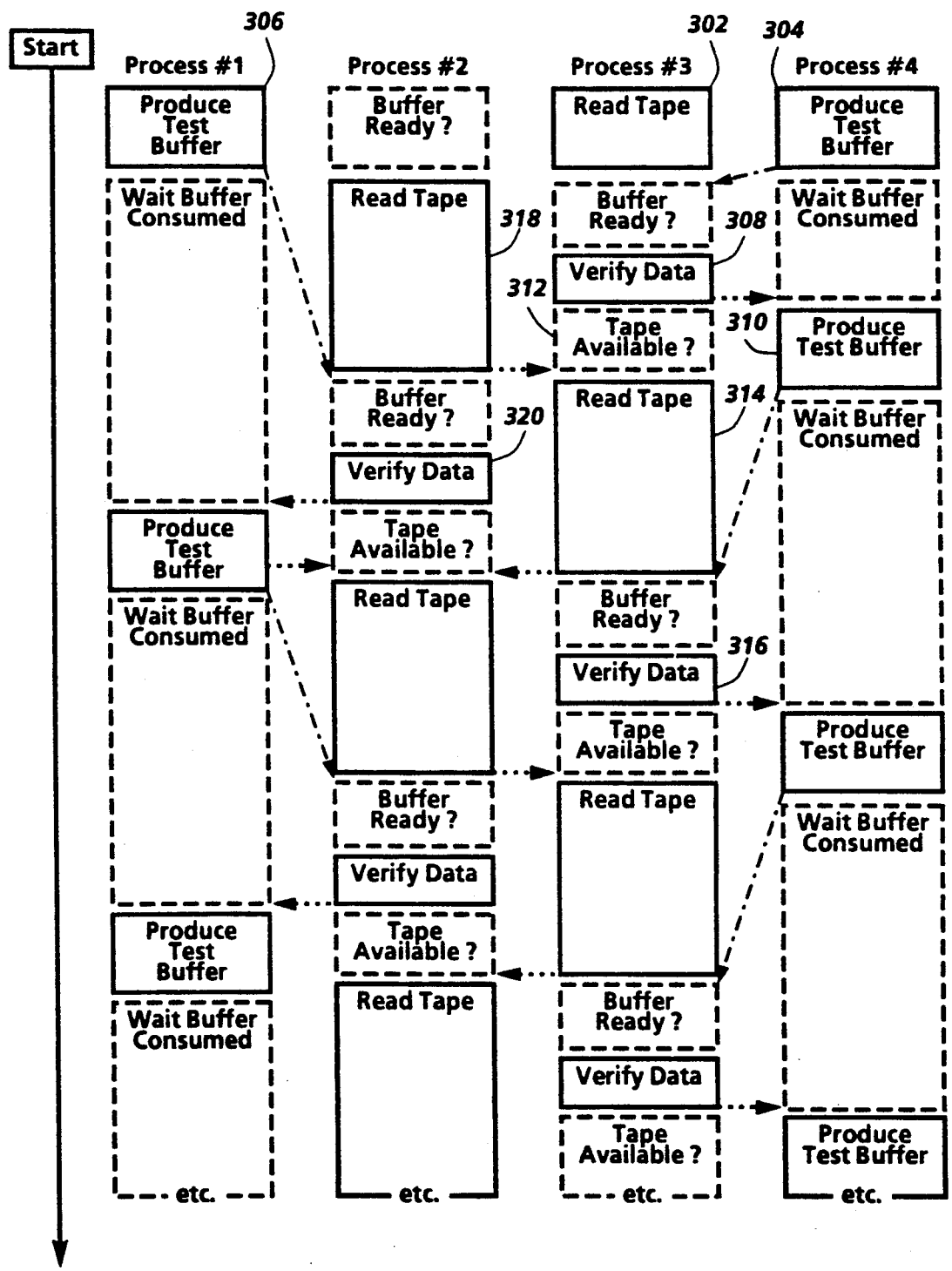
Figure 12:
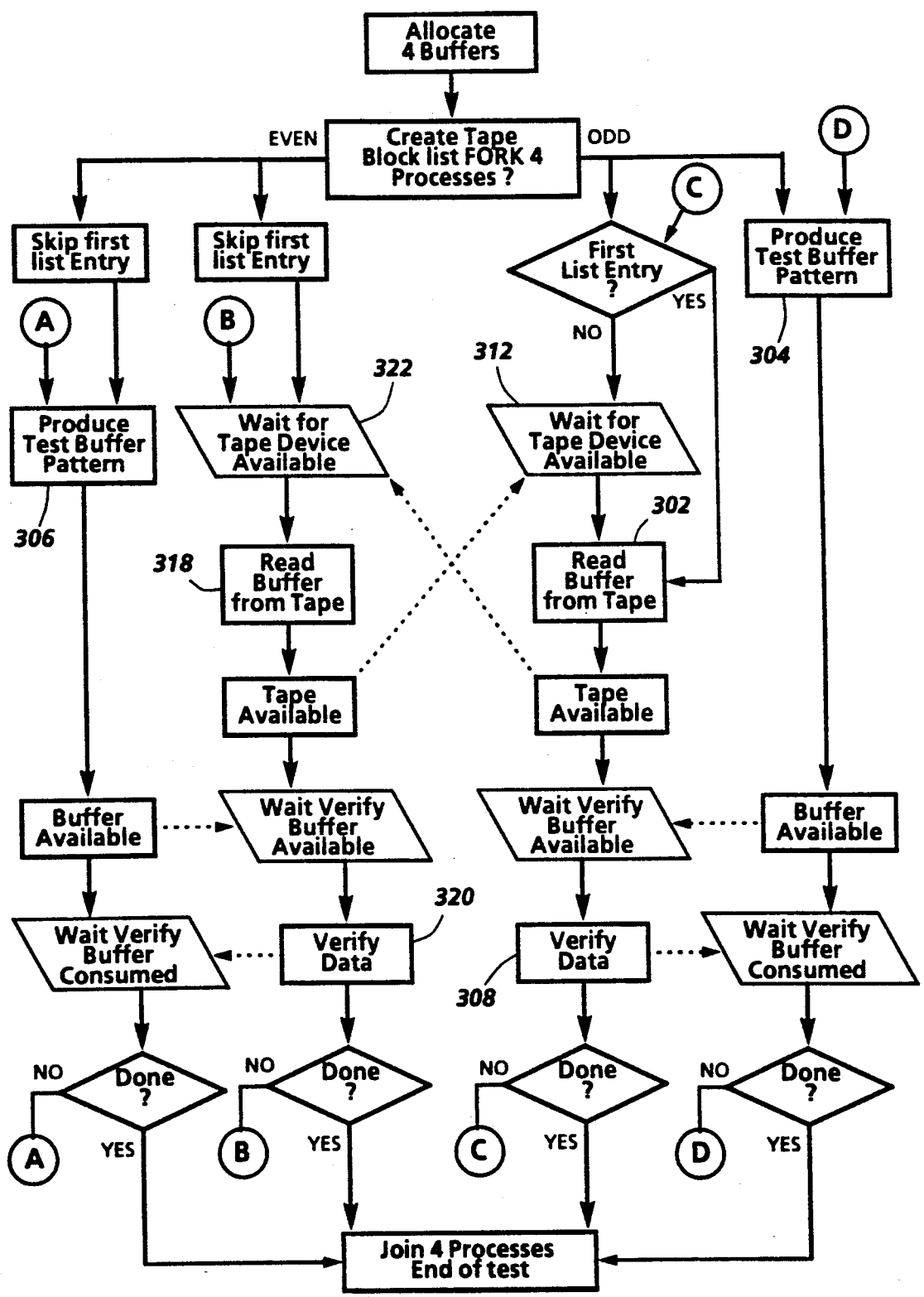

FIGS. 5A, 5B, and 5C comprise a schematic block diagram showing the major parts of the system control section;

FIG. 6 is a block diagram depicting the Operating System, with Printed Wiring Boards and shared line connections;

FIGS. 7 and 8 are flow charts of the tape diagnostic in accordance with the present invention;

FIG. 8A illustrates the response to a hard error signal;

FIG. 9 is an illustration of the parallel operation of the write tape portion of the present invention;

FIG. 10 is a flow chart of the parallel operation of the write tape portion of the present invention;

FIG. 11 is an illustration of the parallel operation of the read/verify tape portion of the present invention; and FIG. 12 is a flow chart of the parallel operation of the read/verify tape portion of the present invention;

DETAILED DESCRIPTION OF THE PREFERRED EMBODIMENT

Figure 1:
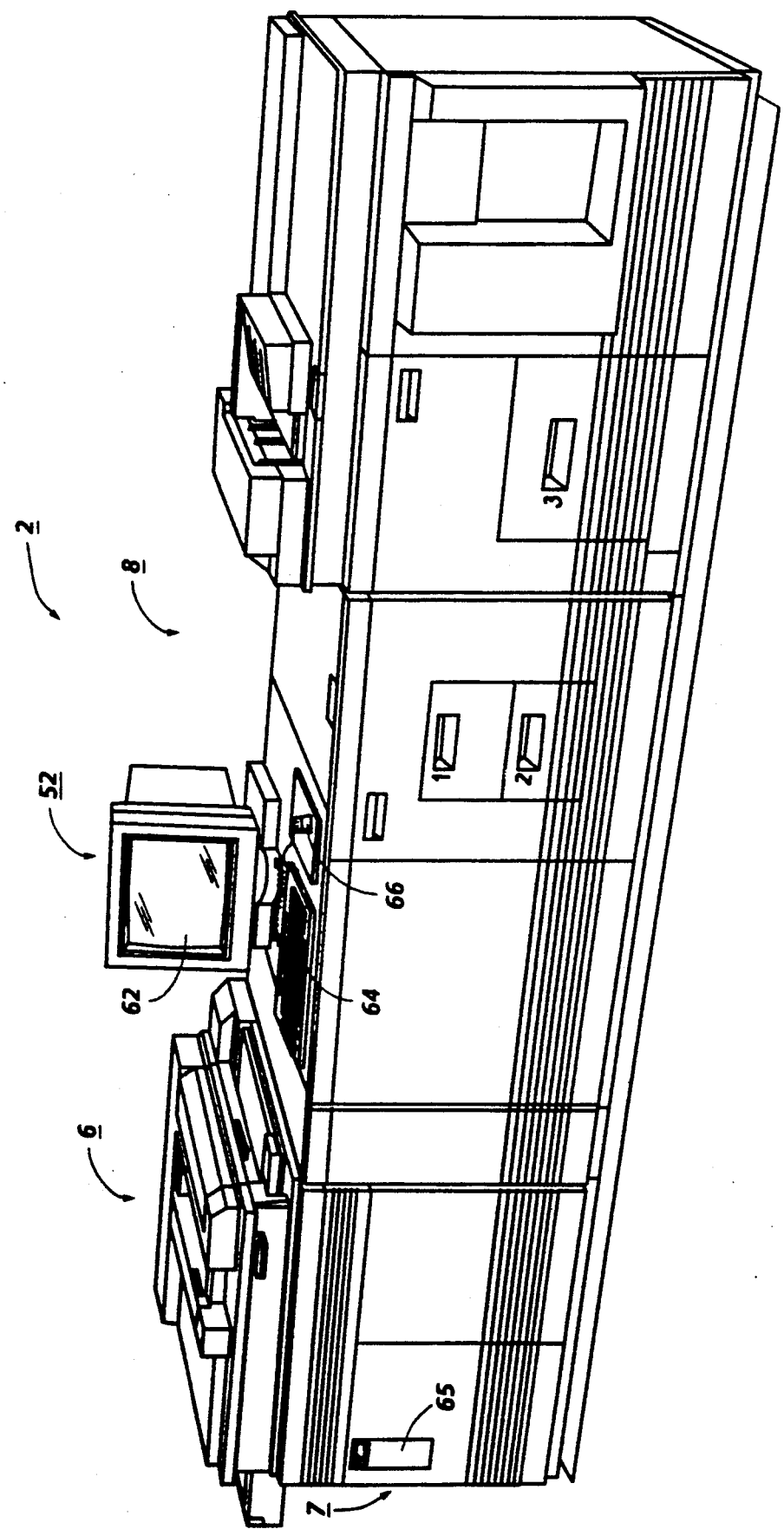
FIG. 1 is a view depicting an eletronic printing system with the job supplement of the present invention allowing building of print jobs from diverse inputs or in response to special programming instructions.
Figure 2:
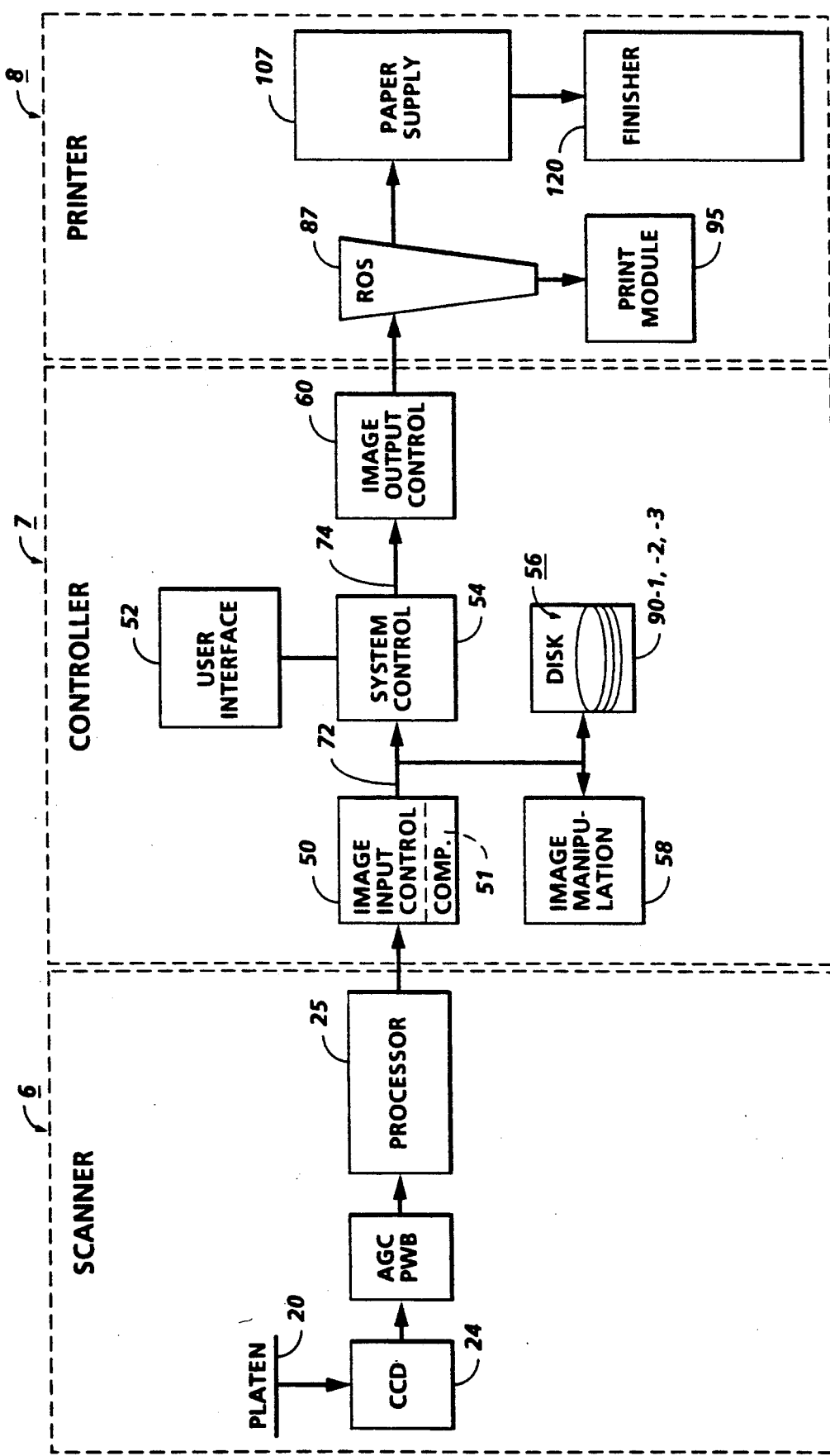
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
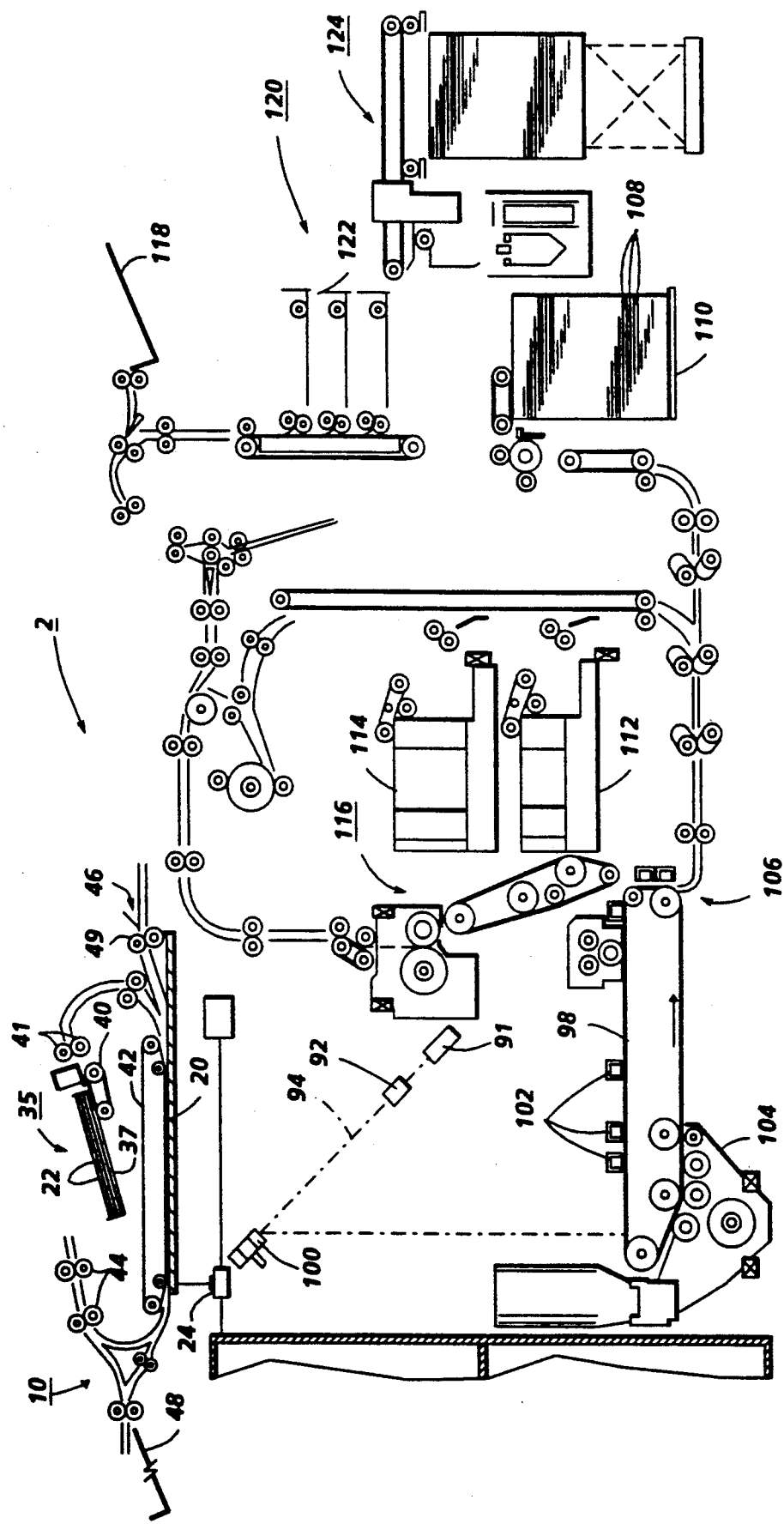
FIG. 3 is a plan view illustrating the principal mechanical components of the printing system shown in FIG. 1.
Figure 4:
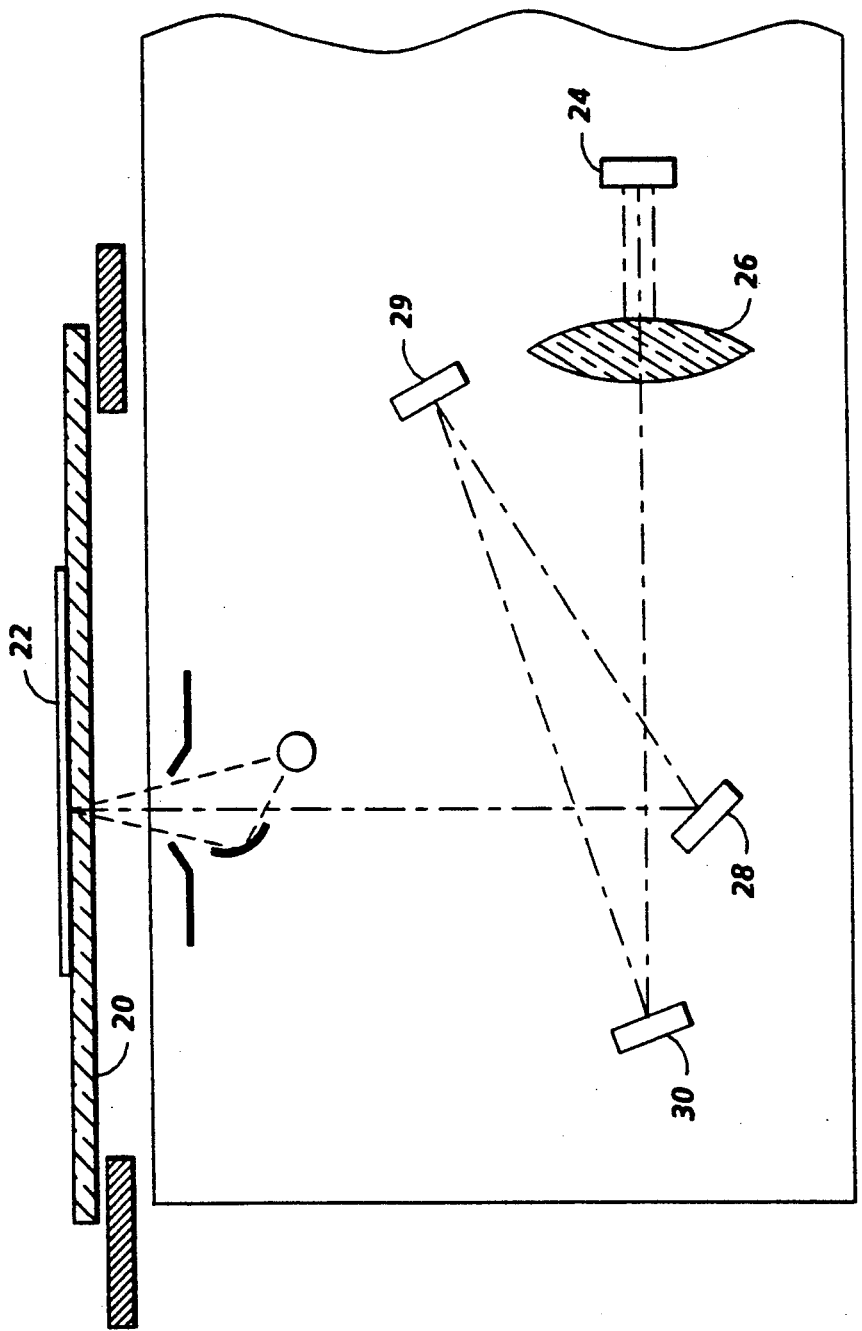
FIG. 4 is a schematic view showing certain construction details of the document scanner.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming the system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWbs 70-7, 70-8 (see in FIG. 5A).

Following this, the data is output by dispatch processors 88, 89 on PWB 70-9 to printer section 8. Image data sent to printer section 8 for printing is normally purged from memory 56 to make room for new image data.

Referring particularly to FIGS. 5A–5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2. displayed. If there is an error in saving the data, the appropriate error code could be displayed.

With reference to FIGS. 7 and 8, there is disclosed a flow chart of the tape diagnostics in accordance with the present invention. As illustrated, to perform the test it is assumed that the operator has already inserted a test tape into the tape drive 65 shown in FIG. 1. The contents of the tape are read into a suitable memory location as illustrated at 202 in FIG. 7, and the system determines initially if there is a tape drive error illustrated at 204, and error signal or message being displayed at interactive touch screen 62. A tape not in drive error signal is determined at 206, a tape not actually being in the drive resulting in a request for the operator to insert a tape into the drive 208, otherwise a hard error signal is produced as illustrated at 210. If there is no tape drive error at 204, the next operation is to read a tape directory at 212 and then to determine if there is a tape error at this point at 214. If there is a tape error, a hard error message or fault code will be displayed as illustrated at 216, otherwise there is a parsing of a bad block table for the determination of blocks to use in the test shown at 218. There is then conducted a preliminary test to determine the level of bad blocks of data, more than 5% bad blocks resulting in another hard error fault code at 220 or at 222 if the bad block count does not match a bad block table. If the bad block count does match the bad block table, there is a tape protect determination at 224. Depending upon the tape protect decision 224, either the read test at 226 or the write test at 228 is commenced, or a hard error fault declared.

If the read test is being conducted, the reading of all selected blocks, and an attempt to preserve streaming capability is initiated at 230 as shown in FIG. 8. If the write test is being conducted, there is a write of all selected blocks, and an attempt to preserve streaming capability at 232. In either case, a determination of a soft tape error results in an update of a soft error count at 234 to continue the test. If there is no soft tape error, there is a test for a hard tape error at 236 in the read test and at 238 in the write test. In either case if there is a hard error determined there will be a hard error fault declared. In the read test, if there is no hard tape error, the test is passed as illustrated at 240. FIG. 8A illustrates the response to a hard error signal. A determination is made at 241 whether or not the error is an identifiable fault. If identifiable the fault is logged and translated at 243, 245 and Service Code displayed at 247.

With regard to the write test, if there is no hard tape error detected at 238, there is a read of all selected blocks attempting to preserve streaming capability at 242 and, in a manner similar to the read test only the read portion of the write/read test continues. There is a test for a soft error at 244. If there is a soft tape error, there is an update of a soft error count at 246 and a continuation of the test. If there is no soft tape error but a determination of a hard tape error or a data match error, at 248 and 250 respectively, a hard error fault code is displayed. Finally, if there is no hard tape error nor a data match error, there is a test of the second time for the first selected block at 252. If in fact it is a second time for first selected block, the test is passed as illustrated at 254 otherwise, there is a selection of the first and second blocks and a repeat of the steps beginning at 232.

With reference to FIGS. 9 and 10, there is an illustration of the parallel operation of the write tape portion of the present invention and a flow chart of the parallel operation of the write tape portion. With reference to FIG. 9, by convention, it should be understood that a solid block represents an active process and a dotted block represents a process waiting for the completion of another process. By a process is meant a portion or batch of the control code that is an entity of itself. A dotted arrow refers to a waiting process that is activated and a combination dotted/dashed arrow indicates that the next waiting process will be activated immediately. As shown, processes #2 and #3 are the write to the tape processes running in a parallel fashion. Process #1 is a process to produce test buffers associated with process #2 and process #4 is the process to produce test buffers associated with process #3.

At the start of the procedure, both processes #1 and #4 begin producing test buffers for data to be written to the tape at 260 and 261. As illustrated in FIG. 9, at the top of processes #2 and 3# at 262 and 263, there is a waiting period for a buffer to be ready. One of the buffers is ready before the other, in the example shown the buffer produced by process #4 is ready for process #3 first. Thus, there is a write to tape operation controlled by process #3 as illustrated at 264. Upon completion of the write to tape operation 264, process #4 begins producing another test buffer as illustrated at 266. In the meantime, process #2 has been waiting for the tape to become available as illustrated at 268 while the write to tape operation 264 is completed. Upon completion of the write to tape operation 264, process #2 has access to the tape to begin the write to tape operation. While the write to tape operation 270 is in progress by process #2, process #4 has completed the production of test buffer as illustrated at 266. Process #3 must now wait for the tape to become available as shown at 272. Upon completion of the write to tape operation 270, the tape is then available for process #3 to begin write to tape operation 274. Upon completion of the write to tape operation 270, process #2 is looking for a test buffer to be available as shown at 276. Upon completion of a test buffer by process #1 as illustrated at 278 and upon completion of the production of the test buffer at 278, process #2 is ready for the tape to be available as shown at 280. Upon completion write to tape operation 274 by process #3, process #2 can begin a new write to tape operation 282. The operation proceeds in a similar matter with each of the processes 2 and 3 alternating the writing to tape and each of the processes #1 and #4 producing test buffers for the respective processes 2 and 3.

This general process is illustrated in FIG. 10. The allocate two buffers and create tape block list for blocks are initial allocation of buffers and the fork to even and odd paths illustrates the alternate procedures of processes 1 and 2 alternating with processes 3 and 4 in FIG. 9. In particular the produced test buffer pattern blocks as illustrated at 284 and particular the produced test buffer pattern blocks as illustrated at 284 and 286 represent the activity of the two parallel operations including the wait for tape device available operations as illustrated at 288 and 290. As is illustrated in FIG. 9 at 270 and 264, in FIG. 9 there are write to tape operations 292 and 294 as well as tape available waiting periods 296 and 298 corresponding to tape available waiting periods 268 and 272. The remaining operations of FIG. 10, are the typical iterations of the loop until the last block or buffer has been filled to write to tape. At the end of the write to tape process, the procedure is ready to initiate a ready verify operation as illustrated at 300.

With reference to FIGS. 11 and 12, there is disclosed the read verify portion of the diagnostic test. This portion of the diagnostic is similar to the write to tape portion except that for each of the parallel processes, it is necessary to create two buffers rather than one buffer as in the write portion of the test. In particular, for each of the parallel processes, a block of data is read from the tape to a tape buffer to become compared with verification data contained in a test buffer. In other words, test data from the tape is stored in a tape buffer. Concurrently, the data that was originally stored on the tape is recreated and stored in the test buffer. A verification process then determines if the data that was originally stored on the tape and currently resides in the test buffer is identical to the data that is being read from the tape that should correspond to the data in the test buffer.

With reference to FIG. 11, similar to the procedure in FIG. 9, process #2 and process #3 are parallel processes to read from the tape. Process #4 is associated with process #3 to create the test buffers and process #1 is related to process #2 to create test buffers for process #2. The read verify portion of the test commences with one of the processes reading a block or portion of data from the tape as illustrated at 302. This assumes that process #3 is the first of the processes #2 and #3 to have access to the tape. Concurrently, process #4 will be producing a test buffer at 304 for process #3, and also process #1 will be producing a test buffer at 306 for process #2. Upon completion of the read tape operation 302 into a tape buffer and the production of a test buffer at 304, there is a comparison and verification of the data as illustrated at 308. Upon verification of the data at 308, process 4 produces another test buffer as illustrated at 310. Process #3 waits until the availability of the tape to read another block of information into a tape buffer as illustrated at 312. Upon the availability of the tape, process #3 begins the read tape operation into a tape buffer 314. Upon the completion of the read tape into the tape buffer operation and the availability of a test buffer at 310, the verify data operation is undertaken as illustrated at 316. As illustrated in FIG. 11, this procedure is repeated and also the parallel procedure of process #2 and #1, process #2 reading the tape at 318 into a tape buffer after the tape is available as shown at 319. Upon the availability of a test buffer at 306 and the tape, a verified data operation is performed as shown at 320. The interaction between process #2 and process #3 is the sharing of the tape and the alternate read tape operations. After each verify data operation, each of the processes #2 and #3 is able to begin reading another portion of the tape or must wait a period for the tape; to become available.

FIG. 12 is a flow chart of the operation as illustrated in FIG. 11. There is an allocation of the 4 buffers and that after a read operation into a tape buffer and the creation of a test buffer, there is a verify data operation. Thus, there is illustrated produced test buffer pattern operations 304 and 306 and wait for tape device available blocks as illustrated at 312 and 322. The read tape operations are illustrated at 302 and 318 the verify data operations are illustrated at 308 and 320. As shown in FIG. 12, upon the completion of each verify data operation, the procedure loops to begin the next wait for tape device available sequence. it should be understood that the parallel processes can be performed either simultaneously or concurrently.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In an electronic image processing apparatus having image processing means, a controller electrically interconnected to the image processing means for directing the operation of the image processing means, the controller including a plurality of first buffers and a plurality of second buffers, a system memory, a disk memory connected to the first buffers and the second buffers and to the system memory, an external storage device port for communicating with a tape for serially storing data, the tape and the disk memory being electrically connected to the external storage device port, the method of diagnosing the serial to parallel transfer of data between the tape and the disk memory comprising the steps of:

creating a plurality of blocks of data within the controller for transfer to the tape via the external storage device port, transferring said plurality of blocks of data via the external storage device port to the tape, recreating said plurality of blocks of data in the plurality of first buffers, reading the plurality of blocks of data from the tape via the external storage device port to the plurality of second buffers, and comparing the plurality of blocks of data from the tape in the second buffers with the data in the plurality of first buffers in a parallel manner.

2. In an electronic image processing apparatus having image processing means, a controller for directing the operation of the image processing means, the controller including a plurality of processors, the method of diagnosing the transfer of data between a serial memory and a random access memory by controlling the operation of a first and a second process comprising the steps of:

producing test buffers for the first and the second processes, the test buffers storing data to be transferred between the serial memory and the random access memory, the first process initially obtaining access to the serial memory for the transfer of data, the first process transferring the data in a first test buffer when said first test buffer is ready, the second process suspending operation until the availability of the serial memory and a second test buffer, the second process obtaining access to the serial memory for the transfer of data in the second test buffer, the first process suspending operation until the availability of the serial memory and a third test buffer, and repeating the alternating operation of the first and second processes to diagnose serial to parallel data transfer and determine transfer faults.

* * * * *